United States Patent [19]
Johnson

[11] Patent Number: 5,103,660
[45] Date of Patent: Apr. 14, 1992

[54] REMOVABLE STEERING WHEEL DEVICE, AND METHODS OF CONSTRUCTING AND UTILIZING SAME

[76] Inventor: Virgil T. Johnson, 27350 Lahser Rd., Southfield, Mich. 48034

[21] Appl. No.: 401,810

[22] Filed: Sep. 1, 1989

Related U.S. Application Data

[63] Continuation-in-part of Ser. No. 602,947, Apr. 23, 1984, abandoned.

[51] Int. Cl.$^5$ ............................................. B60R 25/02
[52] U.S. Cl. ...................................... 70/209; 70/237; 70/163
[58] Field of Search .................. 70/207, 209, 224–225, 70/237, 252, 158–173; 74/552; 403/1

[56] References Cited

U.S. PATENT DOCUMENTS

| | | | |
|---|---|---|---|
| 1,330,414 | 2/1920 | Vanderlip | 70/237 |
| 2,155,064 | 4/1939 | Sandberg | 70/210 |
| 4,028,915 | 6/1977 | Stahl. | |

FOREIGN PATENT DOCUMENTS 520483  6/1921  France ................................ 70/207

*Primary Examiner*—Robert L. Wolfe
*Attorney, Agent, or Firm*—Irving M. Weiner; Robert M. Petrik; Pamela S. Burt

[57] ABSTRACT

A removable steering wheel assembly to aid in the prevention of theft of vehicles. The removal of the steering wheel renders the vehicle undrivable by a potential thief.

A first embodiment of the present invention contemplates removal of the steering wheel and key ignition to render the vehicle undrivable.

A second embodiment provides a removable steering wheel and cover to prevent the attachment of other steering wheels.

3 Claims, 2 Drawing Sheets

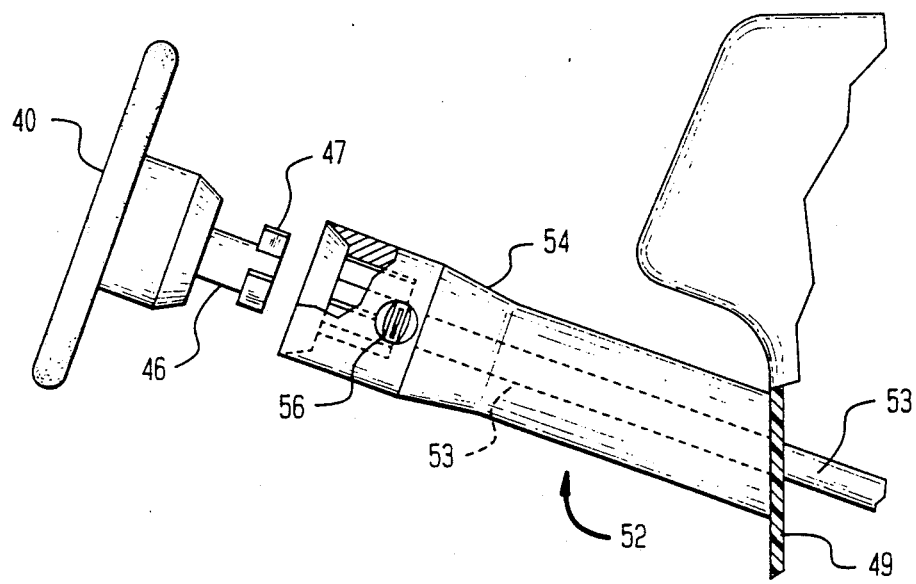
FIG. 3
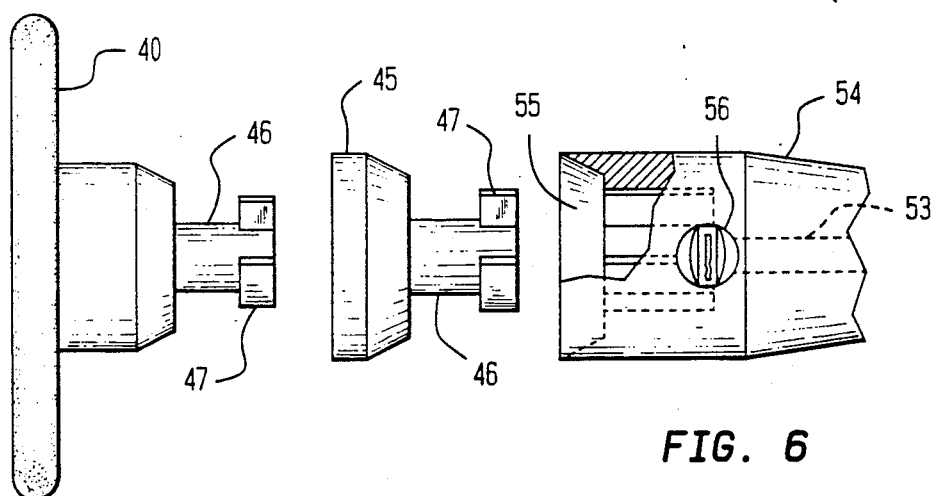
FIG. 4
FIG. 5
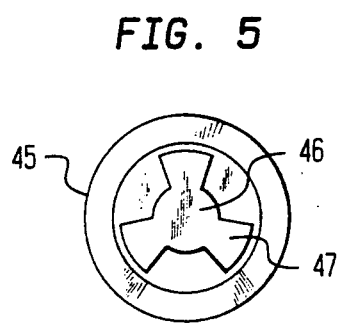
FIG. 6
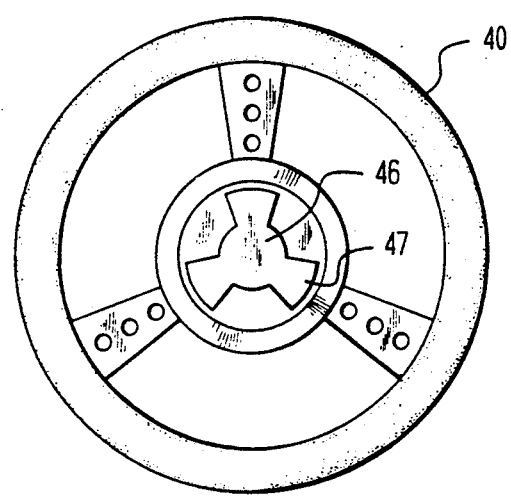

REMOVABLE STEERING WHEEL DEVICE, AND METHODS OF CONSTRUCTING AND UTILIZING SAME

CROSS-REFERENCES RELATED TO APPLICATIONS

This application is a continuation-in-part application of U.S. Ser. No. 602,947, filed Apr. 23, 1984 and now abandoned.

BACKGROUND OF THE INVENTION

1. Field of the Invention

The present invention relates to a steering wheel assembly. More particularly the invention comprises a removable steering wheel device adapted to aid in the prevention of the theft of an automobile.

2. Description of the Relevant Art

Steering wheels are generally intended to be permanently mounted on a steering column, to facilitate steering the motor vehicle on which a steering wheel is installed. Because steering wheels are intended to be essentially permanent installations, the removal or replacement of a steering wheel requires wrenches and/or other special tools.

Applicant believes, that in this day and age, the high incidence of motor vehicle theft necessitates the need for theft deterrent measures. To this end, the present invention includes a steering wheel that is secured to the vehicle steering column in such a manner that it may be readily replaced or removed.

The relevant art which may be considered in evaluating the applicant's invention is as follows.

U.S. Pat. No. 2,155,064 issued in 1939 to Sandberg entitled "AUTOMOBILE LOCKING STRUCTURE" discloses a locking arrangement for the steering wheel and shaft. Sandberg provides a lock structure mounted on a bearing bracket for the steering shaft and provides a locking element key operable for interlocking engagement with a keeper element secured directly to the steering wheel hub. Upon turning a cylinder by the proper key, a locking plunger may be shifted to a steering, locking or unlocking position, the locking plunger being held against rotational movement by means of a pin or screw projecting into a longitudinal groove in the locking plunger.

Sandberg neither discloses or suggests the removability of a steering wheel to ensure that the vehicle will not be stolen.

U.S. Pat. No. 4,028,915 issued in 1977 to Stahl entitled "LEVER ARM LOCK FOR A QUICK RELEASE HUB ASSEMBLY" discloses a lever arm lock for a quick-release hub assembly including a cover mountable to a first skewer rod end nut supporting a quick-release lever arm. Stahl's mechanism provides a means for preventing theft of a bicycle wheel from bicycles which are equipped with quick-release hub assemblies.

Stahl fails to disclose a steering column assembly and the removability of a steering wheel to prevent theft.

The present invention provides a means for preventing the theft of automobiles by temporarily removing the steering wheel and rendering the automobile undrivable.

SUMMARY OF THE INVENTION

The present invention provides a steering wheel assembly having a locking mechanism for removably attaching a steering wheel to a steering column assembly. Preferably, according to the second embodiment of the invention, the locking mechanism includes a cover assembly that is placed on the steering column when the steering wheel has been removed. This prevents other steering wheels from being inserted and locked onto the steering column.

Generally, the locking mechanism comprises a key receptacle at one end of the steering column such that the cylinder may be rotated by the movement of a key in the key receptacle to move a locking member to an engaging and disengaging positions.

The steering column assembly includes a steering column and optionally a shroud surrounding the steering column. Generally, the shroud of the steering column assembly would be tapered at the top for matingly receiving a hub end of the steering wheel or cover therein.

The locking mechanism is preferably, but not necessarily, additionally connected directly to the automobile ignition system. This arrangement allows the same key to be utilized for removably attaching the steering wheel and for activating and deactivating the automobile ignition system. When used as an ignition system switch, the locking mechanism would include other positions such as an ignition-off position and an ignition-on position.

It is an object of the present invention to provide a removable steering wheel to prevent the theft of an auto so equipped.

It is a further object of the present invention to provide a cover for the steering column when the steering wheel is removed to prevent the use of other steering wheels on the steering column.

The above and further objects, details and advantages of the invention will become apparent from the following detailed description, when read in conjunction with the accompanying drawings.

BRIEF DESCRIPTION OF THE DRAWINGS

FIG. 3 illustrates a side view of a second embodiment of the removable steering wheel and steering column assembly in accordance with the present invention.

FIG. 4 illustrates a side view of the second embodiment including a cover member in accordance with the present invention.

FIG. 5 illustrates an end view of the steering column of FIG. 3 in accordance with the present invention.

FIG. 6 illustrates an end view of the steering wheel of FIG. 3 in accordance with the present invention.

DETAILED DESCRIPTION OF THE PREFERRED EMBODIMENT

Figure 1:
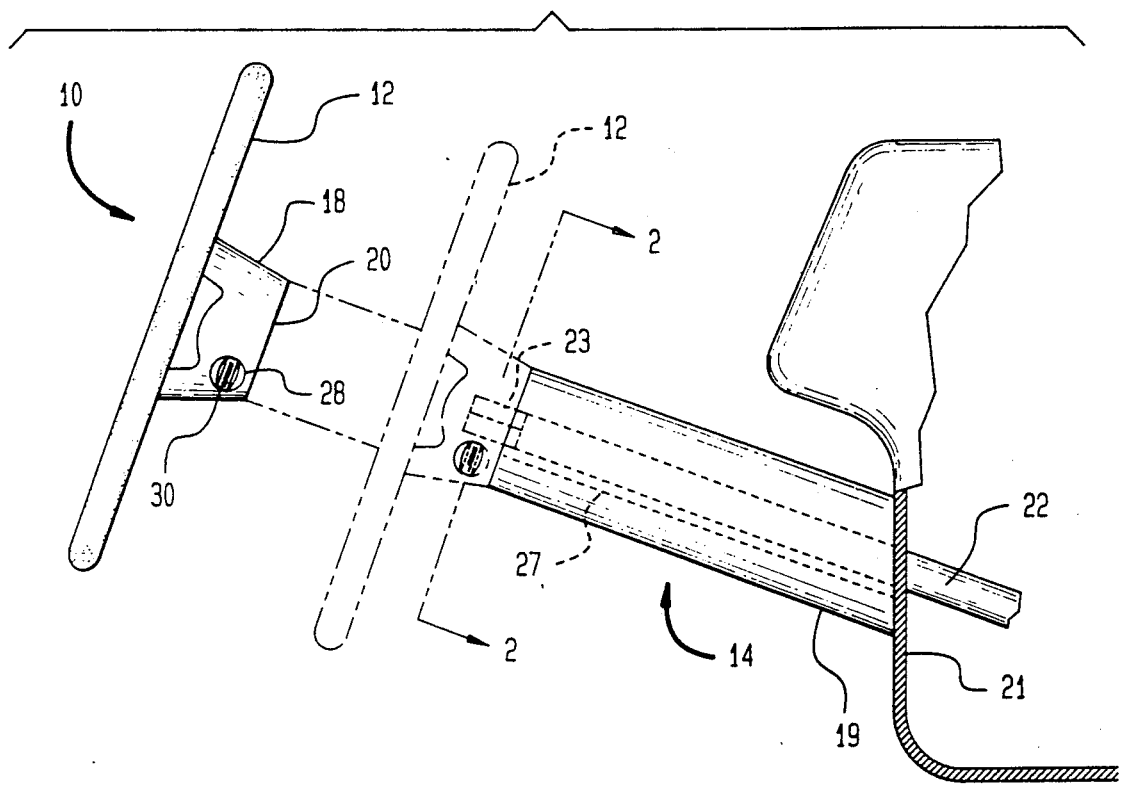
FIG. 1 illustrates a side view of a first embodiment of the removable steering wheel and column assembly in accordance with the present invention.

As shown in FIG. 1, a removable steering wheel assembly 10 to aid in the prevention of theft of the automobile includes a removable steering wheel 12 and locking means 14. FIG. 1 shows the steering wheel 12 attached (shown in Phantom) and removed from the steering column assembly 14. Steering wheel 12 has a hub 18 which tapers to end 20 to mate with the steering column assembly 14.

Steering shaft 22 passes through fire wall 21 from the engine compartment. Shaft 22 is journaled for rotation within the steering column assembly 14 and includes a portion 23 which extends above the shroud 19 of the steering column assembly 14. Hub 18 includes a central opening 25 for receiving portion 23 of shaft 22.

Figure 2:
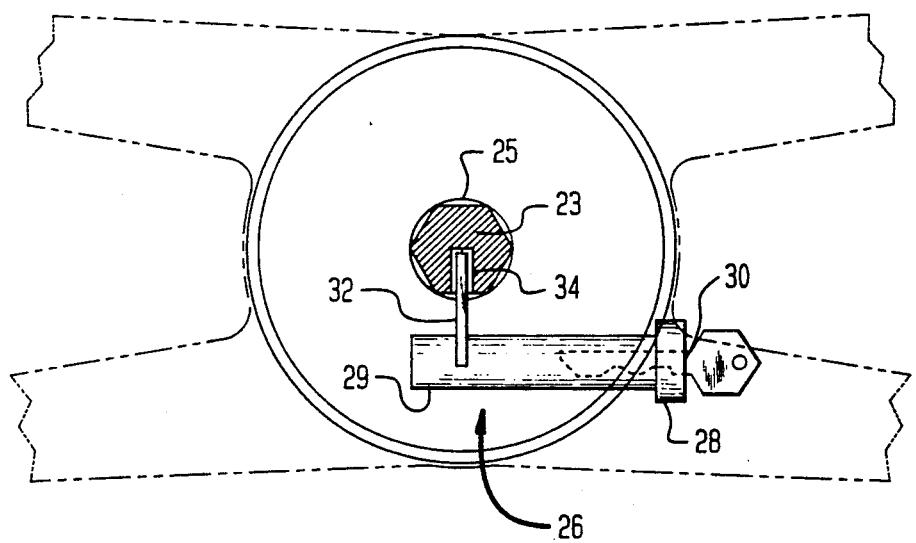
FIG. 2 illustrates a section view of the embodiment shown in FIG. 1 taken along line 2—2 in accordance with the present invention.

As shown in FIGS. 1 and 2, transversely mounted within hub 18 is a locking means 26. Best shown in FIG. 2, locking means 26 comprises a first end 28 and second end 29. First end 28 includes a key receiving portion 30 therein. Locking means 26 operatively engages locking pin 32 receiving portion 23 includes a mating portion 34 for receiving locking means 26.

In use, when the steering wheel 12 is mounted atop steering column assembly 14, mating portion 34 is aligned with locking means 26. By rotating the locking means in a predetermined direction to a first position as is well known in the lock art, locking pin 32 will be extended, or translate, to engage mating portion 34 and lock the steering wheel 12 atop the steering column assembly 14 for use in steering the vehicle.

When the locking means is disengaged by rotation of a key in a predetermined direction to a second position as is well known, the steering wheel 12 may be removed from the steering column assembly 14 and thus prevent a thief from driving the vehicle.

Locking means 26 may also be connected to the ignition system of the vehicle. Preferably, but not necessarily, locking means 26 would be electrically connected to the ignition system by wires 27. Locking means 26 may include a third and fourth position for engaging and disengaging an ignition system.

When locking means 26 also operates the ignition system of the vehicle, the wires 27 must be disconnectable from the steering column when the steering wheel 12 is removed. In addition, the wires must be easily reconnectable when the steering wheel 12 is replaced on the steering column assembly 14.

This may be accomplished by employing snap connectors (not shown), as is well known, on the ignition wire 27 and on a mating portion on the steering wheel 12.

Disabling the ignition system in this manner further hinders a thief from stealing the vehicle.

Shown in FIG. 3 is a second embodiment of a steering wheel assembly in accordance with the present invention. As discussed above with respect to FIG. 1, steering wheel 40 is adapted to be removably attached to a steering column assembly 52 to prevent the theft of a vehicle. In addition, when steering wheel 40 is removed from steering column assembly 42, a cover means 45 is provided to prevent the connection of an unauthorized steering wheel.

The steering column assembly 52 includes a steering column 53 journaled for rotation and which passes through a fire wall 49 from the engine compartment. A shroud or cover 54 surrounds the steering column 53.

The upper end of steering column assembly 52 includes an opening 55 which is adapted to receive the steering wheel 40 and cover 45. The upper end of steering column 53 is located adjacent opening 55 and is also adapted to receive the steering wheel 40 and cover 45.

Lock means 56 is located near the upper end of the steering column assembly 52.

Lock means 56 will accommodate a key to actuate the ignition system of the vehicle. In addition, as discussed before, the lock means 56 may engage securement means to permit the steering wheel 40 to engage a steering column 53. The securement means may comprise a pin as discussed above or any other well known securement means. These could include but is not limited to a bayonet connection, path obstruction flanges or a magnetic connection engaged by the ignition.

Steering wheel 40 and cover 45 have extending therefrom steering column engaging means 46 which is adapted to enter opening 45 and engage the upper end of steering column 53. Steering column engaging means 46 includes lugs or ears 47 which are received in corresponding receiving portions on the upper end of the steering column 53. The particular arrangement of the lugs 47 may also be varied to ensure that only one steering wheel 40 and cover 45 may be used on a single vehicle. Accordingly, the upper end of steering column 53 must accept the arrangement of the lugs 47.

Cover means 45 is placed upon the steering column assembly 52 when the steering wheel 40 is removed. This will prevent the unauthorized use of another steering wheel by a thief attempting to steal the vehicle.

Although there has been described what is a present considered to be preferred embodiments of the invention, it will be understood that various modifications and variations may be made therein, and it is intended to cover in the appended claims all such modifications as found within the true spirit and scope of the invention.

I claim:

1. A removably attachable steering wheel assembly for the prevention of the unauthorized use of the vehicle, comprising:

a steering wheel and steering column cover engageable with an upper end of a steering column, said steering column actuating the steering mechanism of the vehicle;

said steering wheel and steering column cover includes steering column engagement means comprising a plurality of lugs received with in a corresponding number of recesses at said upper end of said steering column;

locking means for securing said steering wheel and said steering column cover to said steering wheel and said steering column cover to said steering column such that when said steering wheel is removed, said steering column cover is placed on said steering column and prevents access to said steering column rending said steering mechanism inoperative; and said locking means operatively connected to the vehicle ignition system.

2. The steering wheel assembly of claim 1, wherein: said steering column is enclosed by a shroud.

3. The steering wheel assembly of claim 1, wherein: said ignition system is disabled upon removal of the steering wheel.

* * * * *